Inventor,
Anthony G. M. Michell,
By [signature]
Atty.

Patented Sept. 4, 1928.

1,682,924

UNITED STATES PATENT OFFICE.

ANTHONY GEORGE MALDON MICHELL, OF MELBOURNE, VICTORIA, AUSTRALIA, ASSIGNOR TO CRANKLESS ENGINES LIMITED, OF MELBOURNE, AUSTRALIA.

MECHANISM FOR THE INTERCONVERSION OF RECIPROCATING AND ROTARY MOTION.

Application filed January 26, 1927, Serial No. 163,765, and in Great Britain April 7, 1926.

The present invention relates to improvements in mechanisms for the interconversion of rotary and reciprocating motion of the class comprising the combination of a rotating swash plate or slant with one or more reciprocating elements or pistons to each of which is rigidly attached a yoke member partially embracing the periphery of the rotating slant and carrying a pair of pivoted slippers which make sliding contact with the plane faces of the slant.

The primary objects of the present invention are the attainment of greater strength and rigidity in the yoke member, and the provision upon it of a film-lubricated surface by which it is supported upon the periphery of the slant with a sliding contact involving a minimum of friction.

According to the invention, the yoke-member is rigidly connected to the outer or front end of the reciprocating element or piston and is of a crescent-shaped section, preferably hollow, having inner and outer cylindrical bearing surfaces of which the latter slides longitudinally in a stationary part of the mechanism, while the former is in contact with the periphery of the slant as above stated. The yoke carries, rigidly attached to or formed upon its outer end, a lug between which and the front end of the piston are mounted by means of ball-jointed articulations, in suitably-shaped pivoted seatings, a pair of slippers arranged one on either side of the slant and having plane working faces making lubricated contact with the plane faces of the slant, the centres of the ball joints being eccentric to the axis of the outer cylindrical bearing surface of the yoke.

The construction of the yoke may be varied according as the reciprocating element actuates the slant or vice versa. Both in the former class of machine, for brevity called a "motor", and in the latter class, called a "pump", the external bearing surface of the yoke, which is a portion of a cylinder coaxial with the piston, fits a corresponding cylindrical surface bored in a fixed part of the mechanism.

Figure 1:
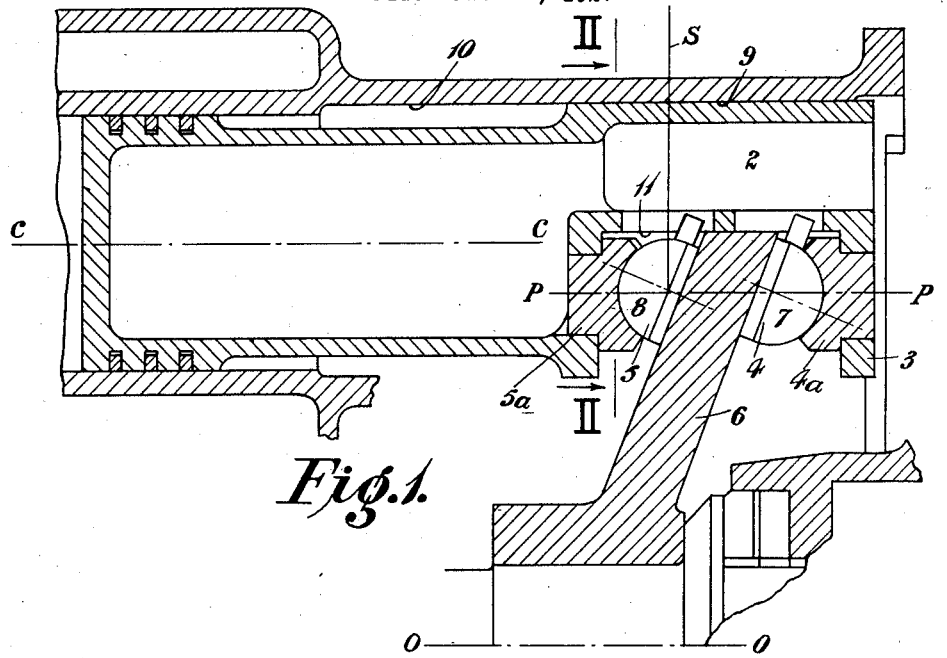
Figures 2, 3:
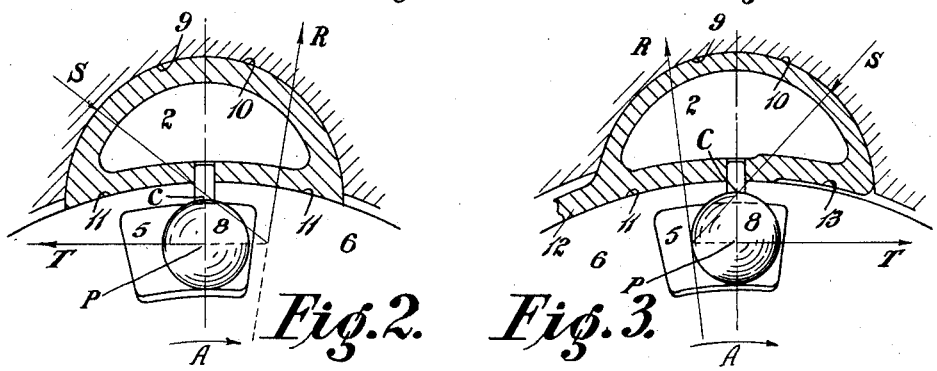

In the accompanying drawings Figure 1 is a longitudinal section of a reciprocating element, together with parts co-acting with such element, according to the invention. Figure 2 is a cross section on line II—II of Figure 1 of the yoke-portion of the reciprocating element as preferably constructed in the case of a motor. Figure 3 is a similar view of the preferred construction for the case of a pump, and Figure 4 is a longitudinal section similar to Figure 1 of the yoke-portion of a reciprocating element according to an alternative mode of construction.

Figure 4:
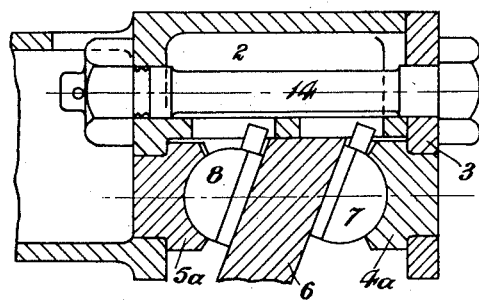

In so far as shown by Figures 1 and 4, the constructions for a pump and for a motor are alike.

As shown in Figure 1 the reciprocating element consists of a piston 1, of usual construction arranged to reciprocate in a cylinder whose axis is the line C—C, and of a yoke 2 having at its outer end an integral lug 3 and carrying slippers 4, 5, which are pivoted in slipper cups $4^a$, $5^a$, by means of hemispherical ball pivots 7 and 8, these slippers making lubricated contact with the slant 6 which revolves about the axis O—O. Each of these parts except the yoke is of known construction.

As regards the general form of the slant, piston element and slippers, reference may be made to United States Patent Re-issue No. 15,756, whilst in United States Patent No. 1,603,852, a yoke construction is described resembling that of the present case in so far as its outer cylindrical bearing surface is described. In that case however, as in all other descriptions of mechanisms of this class hitherto published, the said outer bearing surface was concentric with the ball-pivots of the slippers and the yoke had no contact with the outer periphery of the slant.

In addition to the formation of the yoke section of segmental section with inner and outer bearing surfaces as above described, a feature of the present invention is the location of the common axis of the ball-pivots 7, 8 and cups $4^a$, $5^a$ on a line P—P parallel to, but eccentric with respect to, the axis C—C of the outer cylindrical surface of the yoke and lying between that axis and the axis O—O. The importance of this last feature will be seen from the explanations hereinafter given.

The yoke 2, adapted for application in a motor as shown in cross-section in Figure 2, is of a hollow crescent-shaped form, its internal surface 11, which is a portion of a cylindrical surface coaxial with the slant 6, fitting the external periphery of the latter. The external surface 9 of the yoke is also cylindrical and is a sliding fit in a corresponding cylindrical guide surface 10, formed in a stationary part of the mechanism, with the same or nearly the same axis C—C as the motor cylinder. In the construction of the yoke, 2, adapted to the case of a pump as shown in Figure 3, the internal wall of the yoke instead of being of a plain crescent section, as in Figure 2, is formed with a lateral wing 12 on the leading side of the yoke to provide an extension of the surface 11 which bears on the periphery of the slant 6 in the direction opposite to the direction of rotation which is shown by the arrow A. A corresponding lateral portion of the internal surface 11, is removed from the side opposite to the projecting wing 12, a shallow recess being thus formed as shown at 13.

It will be understood that with each of these constructions, the lateral components of the working pressures on the slippers at the beginning and end of the working strokes of the piston are transmitted through their ball-pivots to the yoke 2 and thence radially either inwards to the periphery of the slant 6, or outwards to the guide surface 10 formed on the stationary part of the mechanism.

At the middle of the working stroke, in the case of a motor as shown in Figure 2, the lateral component of pressure (hereinafter referred to as reaction T, and indicated in the figure by that symbol) imposed by the slipper ball 8 on the yoke in the tangential direction opposite to the direction of motion of the slant indicated by the arrow A, is equilibrated by the resultant of a force (referred to and indicated by the symbol R) which is exerted radially outwards by the periphery of the slant on the internal surface 11 of the yoke, and of a force (referred to and indicated by the symbol S) exerted radially inwards upon the outer cylindrical surface 9 of the yoke by the guide surface 10. The lines of action of the reaction T and forces R and S intersect at a point which is at the rear of the pivot of the slipper 5.

In the case of a pump, as shown in Figure 3, in which the forces, pressures and direction of motion are represented by symbols corresponding to those of Figure 2, the lateral component of pressure T, exerted by the slipper 5 on the yoke at the middle of the working stroke acts in the direction A of the motion of the slant, and the forces R and S exerted on the yoke by the slant and guide surface 10 respectively act in directions as shown in the figure. The point of intersection of the lines of action of T, R and S in this case intersect at a point in front of the pivot 8 of the slipper 5. The wing 12, and recess 13 are however constructed of such tangential lengths, that the point of intersection of the line of action of R and bearing surface 11 is preferably to the rear of the middle point of this surface. Thus both in the case of a motor, (Figure 2) and of a pump, (Figure 3), the point of action of the bearing force R upon the internal bearing surface 11 of the yoke is towards the rear or leading end of that surface having regard to the direction of rotation of the slant. Wedge-film lubrication is thereby rendered possible, the centre of the fluid pressures in the film of lubricant between the surface 11 and the periphery of the slant coinciding with the point of action of the force R.

The construction and functions of the yoke shown in Figure 4, are the same as those described in connection with Figure 1 and either Figure 2 or Figure 3, except that the outer lug 3, instead of being integral with the yoke 2, is rigidly attached thereto by one or more bolts 14, which preferably passes or pass through the hollow crescental portion of the yoke as shown. By this construction the assembly is facilitated of the cups $4^a$ and $5^a$ and slippers 4 and 5 in relation to the yoke 2, and the slant 6. By this means furthermore, the different thermal expansibility of suitable materials such as steel in the bolt or bolts 14, and aluminium alloy in the yoke 2, may be utilized to prevent undesirable changes, due to variations of temperature, in the distance between the centres of the ball pivots 7 and 8, and consequent variations of the working clearances between the slippers and the slant.

In certain cases, as for instance when the metal of which the yoke is constructed is unsuitable for service as a bearing material, one or both of the bearing surfaces 9, 11 instead of being formed directly upon the yoke, may be upon separate members rigidly or non-rigidly attached thereto, these members when non-rigid being preferably arranged as slippers pivoted at points corresponding to the points of intersection of the lines of action S and R with the surfaces 9 and 11 respectively. Alternatively in the case of the external surface of the yoke, a special bearing member may be provided to supply the external bearing surface 10, this member being either rigidly or non-rigidly, and in the latter case preferably pivotally, attached to the stationary part of the mechanism.

I claim:—

1. In mechanism for the interconversion of reciprocating and rotary motion in combination, a reciprocating member, a swash plate, a yoke member connected to said reciprocating member, slipper members pivotally carried by the reciprocating member and the yoke member and engaging with opposite sides of the swash plate, an outer cylindrical guide surface on said yoke eccentric to the pivots of said slipper members, a stationary element engaging said outer cylindrical surface, and an inner cylindrical guide surface on said yoke parallel to and in sliding contact with the periphery of the swash plate.

2. In mechanism for the interconversion of reciprocating and rotary motion, in combination, a reciprocating member, a swash plate, a yoke member connected to the reciprocating member, a pair of pivoted slipper members, means on the outer end of the reciprocating member carrying one of said slipper members, a lug on the outer end of the yoke member carrying the other of said slipper members, said slipper members engaging with opposite sides of the swash plate, an outer cylindrical guide surface on said yoke, eccentric to the pivots of said slipper members, a stationary member engaging said outer cylindrical guide surface, and an inner cylindrical guide surface on said yoke parallel to and in sliding contact with the periphery of the swash plate.

3. In mechanism for the interconversion of reciprocating and rotary motion in combination, a reciprocating member, a swash plate, a yoke member connected to said reciprocating member, pivoted slipper members carried by the reciprocating member and the yoke member and engaging with opposite sides of the swash plate, an outer cylindrical guide surface on said yoke eccentric to the pivots of said slipper members, a stationary element engaging said outer cylindrical surface, an inner cylindrical guide surface with a wing projecting on the leading side of said yoke with said inner cylindrical guide surface and its wing parallel to and in sliding contact with the periphery of the swash plate.

4. In mechanism for the interconversion of reciprocating and rotary motion, in combination, a reciprocating member, a swash plate, a yoke member connected to the reciprocating member, a pair of pivoted slipper members, means on the outer end of the reciprocating member carrying one of said slipper members, a separate lug member attached to the outer end of the yoke member carrying the other of said slipper members, said slipper members engaging with opposite sides of the swash plate an outer cylindrical guide surface on said yoke, eccentric to the pivots of said slipper members, a stationary member engaging said outer cylindrical guide surface, and an inner cylindrical guide surface on said yoke parallel to and in sliding contact with the periphery of the swash plate.

5. In mechanism for the interconversion of reciprocating and rotary motion, in combination, a reciprocating member, a swash plate, a yoke member connected to the reciprocating member, a pair of pivoted slipper members, means on the outer end of the reciprocating member carrying one of said slipper members, a separate lug member attached to the outer end of the yoke member carrying the other of said slipper members, means fastening said lug to the yoke member having a coefficient of thermal expansion different from that of the yoke member, said slipper members engaging with opposite sides of the swash plate, an outer cylindrical guide surface on said yoke eccentric to the pivots of said slipper members, a stationary member engaging said outer cylindrical guide surface, and an inner cylindrical guide surface on said yoke parallel to and in sliding contact with the periphery of the swash plate.

6. In mechanism for the interconversion of reciprocating motion in combination, a reciprocable device, a rotary swash plate, slipper members pivotally carried by the reciprocable device and in lubricated engagement with opposite sides of the swash plate, an outer cylindrical guide surface on said reciprocable device having an axis more remote from the axis of the swash plate than are the pivots of the slipper members, a stationary element in sliding engagement with said guide surface, and an inner cylindrical guide surface on said reciprocable device over the swash plate and concentric with the periphery thereof.

Dated this 24th day of December 1926.

ANTHONY GEORGE MALDON MICHELL.